United States Patent
Scheib et al.

(10) Patent No.: US 6,966,237 B2
(45) Date of Patent: Nov. 22, 2005

(54) FIRST GEAR/REVERSE GATE INDICATOR SWITCH

(75) Inventors: Patrick L. Scheib, Pinehurst, NC (US); Peggy M. Garrett, Aberdeen, NC (US)

(73) Assignee: ZF Meritor, LLC, Maxton, NC (US)

( * ) Notice: Subject to any disclaimer, the term of this patent is extended or adjusted under 35 U.S.C. 154(b) by 608 days.

(21) Appl. No.: 09/824,276

(22) Filed: Apr. 2, 2001

(65) Prior Publication Data

US 2002/0139213 A1 Oct. 3, 2002

(51) Int. Cl.[7] .......................... B60K 17/04; B60K 6/00; B60K 20/00; G05G 9/00
(52) U.S. Cl. ................. 74/473.12; 74/473.19; 74/473.21; 74/473.24; 74/473.25; 74/473.26; 200/33 R; 200/50.01
(58) Field of Search .............................. 74/335, 471 R, 74/473.12, 473.19, 473.21, 473.22, 473.24, 473.25, 473.26, 508, 530; 200/33 R, 50.02, 50.01, 50.11, 50.15, 50.17

(56) References Cited

U.S. PATENT DOCUMENTS

| | | | | | |
|---|---|---|---|---|---|
| 4,133,219 A | * | 1/1979 | Kelbel et al. | ............. | 74/473.21 |
| 4,633,725 A | * | 1/1987 | Jones | ......................... | 74/473.1 |
| 4,660,430 A | * | 4/1987 | Bortfeld et al. | ................ | 74/335 |
| 4,974,468 A | * | 12/1990 | Reynolds et al. | ......... | 74/473.19 |
| 5,546,825 A | * | 8/1996 | Riley et al. | ............... | 74/473.24 |
| 5,737,969 A | * | 4/1998 | Brown et al. | ............. | 74/473.25 |

* cited by examiner

Primary Examiner—David A. Bucci
Assistant Examiner—Colby Hansen
(74) Attorney, Agent, or Firm—Carlson, Gaskey & Olds

(57) ABSTRACT

The first gear/reverse gate switch of the present invention includes a detent switch including a contact pin and a contact switch. When a manual transmission is shifted to a gear not in the first gear/reverse gate, the contact pin of the detent switch engages a recessed portion on a detent mechanism such that the contact pin does not engage the contact switch. This indicates that the transmission is not in a gear in the first gear/reverse gate. When the manual transmission is shifted to a gear in the first gear/reverse gate, the interlock moves the detent, pushing the contact pin into engagement with the contact switch. This indicates that the transmission is in a gear in the first gear/reverse gate. The spring forces the detent into a "relaxed position" when not in the first gear or the reverse gate, breaking switch contact.

15 Claims, 3 Drawing Sheets

FIRST GEAR/REVERSE GATE INDICATOR SWITCH

BACKGROUND OF THE INVENTION

The present invention relates generally to a switch which indicates when a shift lever of a manually controlled transmission is positioned in or is entering the first gear/reverse gate.

Manual transmissions commonly include a reverse biasing mechanism including an interlock and a detent mechanism. The reverse biasing mechanism provides feedback, or a shift feel, to the vehicle operator to indicate where the vehicle operator is in the shift pattern. During vehicle operation, a the shift lever is moved towards a first gear/reverse gate, the detent mechanism coacts with a contoured surface on the interlock and provides resistance in the shift lever. This resistance alerts the vehicle operator that the transmission is in or about to engage the first gear or the reverse gear.

Some vehicle operators may desire a large number of speeds, whereas other operators may not. A typical multi-speed heavy vehicle manual transmission includes a main transmission gear box including five forward speeds and a reverse speed. At times it is desirable to have more speeds ratios, such as when driving through mountains. However, it may be undesirable to have an increased number of speed ratios when driving on flat landscape. Additionally, having many available speeds complicates shifting.

A range box and a splitter box are commonly utilized to increase the number of speeds available, making it possible to change the number of speeds in a transmission without have to replace the transmission. The range box modifies the five forward speeds between a HIGH range and a LOW range, doubling the number of available speeds to ten.

The splitter box can be utilized to split the speed ratios within each of the five main gears in the main transmission, also providing for a greater number of different speed. In this way, the splitter box also doubles the number of available speed ratios. In a manual transmission, the splitter box is only utilized while the transmission is in the first gear. During acceleration when pulling a heavy load, it is desirous to utilize the splitter box only when the transmission is in the first gear or low reverse gear to provide for more speed or to allow the vehicle to "creep."

Hence, there is a need in the art for a switch which indicates when a shift lever of a manually controlled transmission is positioned in or is entering the first gear/reverse gate.

SUMMARY OF THE INVENTION

The present invention relates to a switch which indicates when a shift lever of a manually controlled transmission is positioned in or entering the first gear/reverse gate.

In one embodiment, the manual transmission of the present invention includes a reverse biasing assembly including an interlock and a detent. The interlock includes a contoured perimeter having an arcuate surface and an adjacent elevated ramp. The detent includes a moveable housing positionable by a spring. The moveable housing contacts and rides along the contoured perimeter of the interlock to provide resistance and a shift feel.

When the manual transmission is in either the first gear or the reverse gear, the interlock is positioned such that the elevated ramp is aligned with the housing, compressing the spring. The manual transmission further includes a detent switch including a contact pin and a contact switch. When the transmission is in the first gear or the reverse gear, the surface of the housing pushes the contact pin into engagement with the contact switch, indicating that the transmission is in either the first or reverse gate.

When the manual transmission is shifted into another forward gear in the second gate or third gate, the interlock is rotated such that the arcuate surface is aligned with the housing, expanding the spring. As the spring expands, the housing moves towards the interlock and the contact pin slides into a recessed portion located on the housing. The contact pin breaks contact with the contact switch, indicating that the transmission is not in the first or reverse gate.

While the disclosed embodiment is preferred, other switch embodiments may be used. Accordingly, the present invention provides a switch which indicates when a shift lever of a manually controlled transmission is positioned in or is entering the first gear/reverse gate.

These and other features of the present invention will be best understood from the following specification and drawings.

BRIEF DESCRIPTION OF THE DRAWINGS

The various features and advantages of the invention will become apparent to those skilled in the art from the following detailed description of the currently preferred embodiment. The drawings that accompany the detailed description can be briefly described as follows.

DETAILED DESCRIPTION OF THE PREFERRED EMBODIMENT

Figure 1:
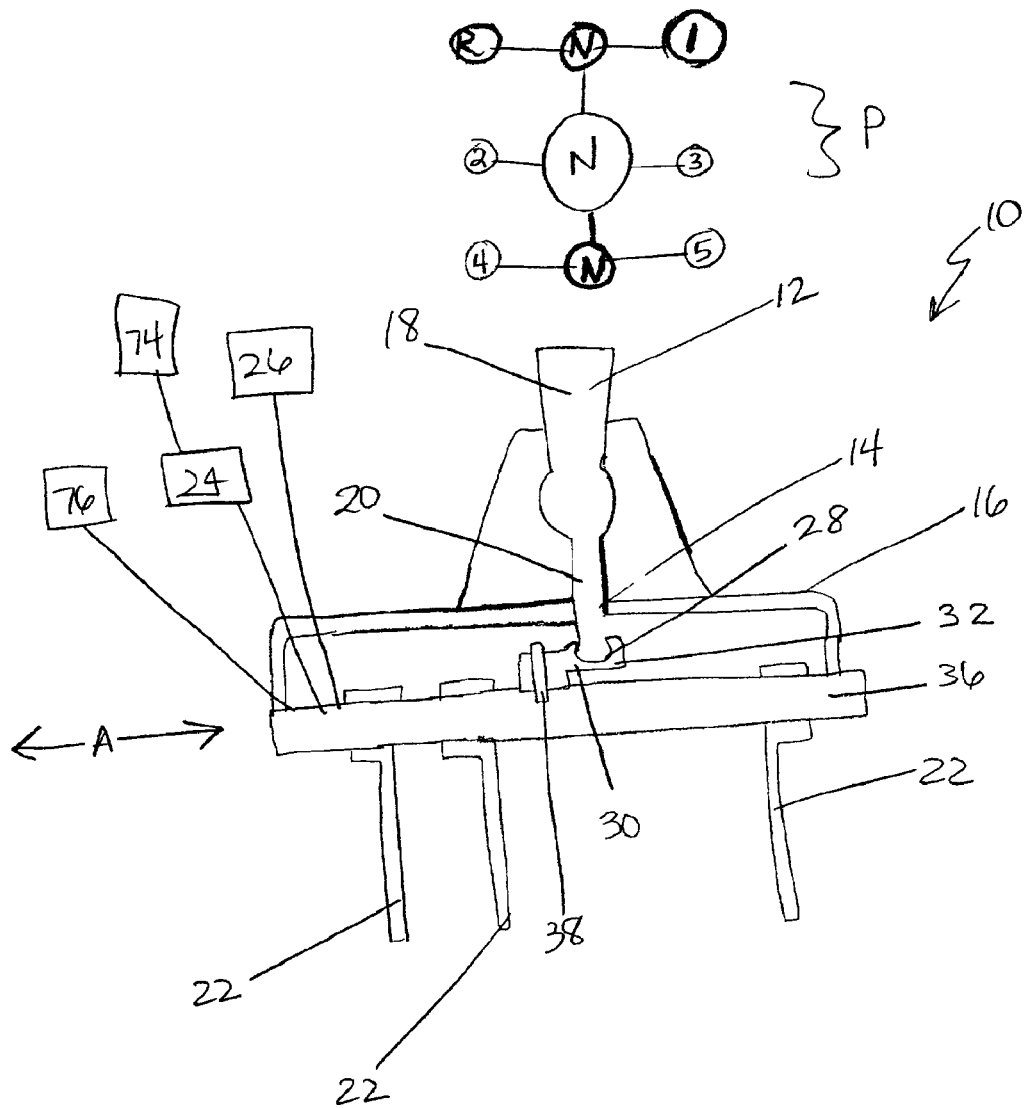
FIG. 1 illustrates a side view of a manually operated transmission.

A manual transmission 10 for a heavy vehicle having a shift pattern P is illustrated in FIG. 1. In the preferred embodiment, the shift pattern P includes a reverse gear and five forward gears. A shift lever 12 extends through an aperture 14 in a top cover 16. The top cover 16 supports transmission components and defines shift pattern P. The shift lever 12 is in a first gear/reverse gate when the manual transmission 10 is in a reverse gear or the first gear. The shift lever 12 is in a second gate and a third gate when the manual transmission 10 is in the second and third gears, and the fourth and fifth gears, respectively.

The shift lever 12 includes a first portion 18 and a second portion 20. When an operator moves the first portion 18 of the shift lever 12 in one direction, the second portion 20 of the shift lever 12 moves in the opposite direction. When a vehicle operator moves the shift lever 12 through the shift pattern P, the shift lever 12 operatively moves a shift fork 22. In this embodiment, there are three shift forks 22. The shift fork 22 engages a clutch collar which engages a gear, causing a gear shift.

A manual transmission 10 further includes a range box 24 and a splitter box 26. The range box 24 modifies the five forward speeds to create double the number of speeds, creating five speeds in a HIGH range and five speeds in a LOW range. A splitter box 26 is utilized to split the speed ratios between the forward gears, also providing for a larger number of speed ratios. In the preferred embodiment, the splitter box 26 is only utilized when the transmission is in the first gear or the reverse gear. By splitting the first or reverse gear, more power or torque can be provided to pull a heavy load and allow the vehicle to "creep."

It should also be understood that splitter gears are sometimes only utilized in other gear speed combinations. As an example, it is known to provide the splitter function only at the highest gear ratios.

The second portion 20 of the shift lever 12 is pivotally received within an aperture 28 in an arm 30 of a shift sleeve 32, the shift lever 12 permitting translational and rotational movement to the shift sleeve 32. The shift sleeve 32 further includes a finger 34 perpendicularly oriented to the arm 30. During shifting, the shift finger 30 operatively and selectively engages shift components to cause a gear shift.

The shift sleeve 32 is fixedly attached to a shift rail 36 by a fastener 38 so that the shift rail 36 moves with the shift sleeve 32. As the first portion 18 of the shift lever 12 is moved forward by the vehicle operator, the shift rail 36, through the shift sleeve 32, translates rearwardly along axis A. Conversely, as the first portion 18 of the shift lever 12 is moved rearwardly, the shift rail 36 is translated along axis A forwardly. When the first portion 18 of the shift lever 12 is moved from side to side, the shift rail 36 rotates about axis A. After moving the shift lever 12, the shift rail 36 operatively moves a shift fork 22, engaging a desired gear to cause a gear shift.

Figure 2:
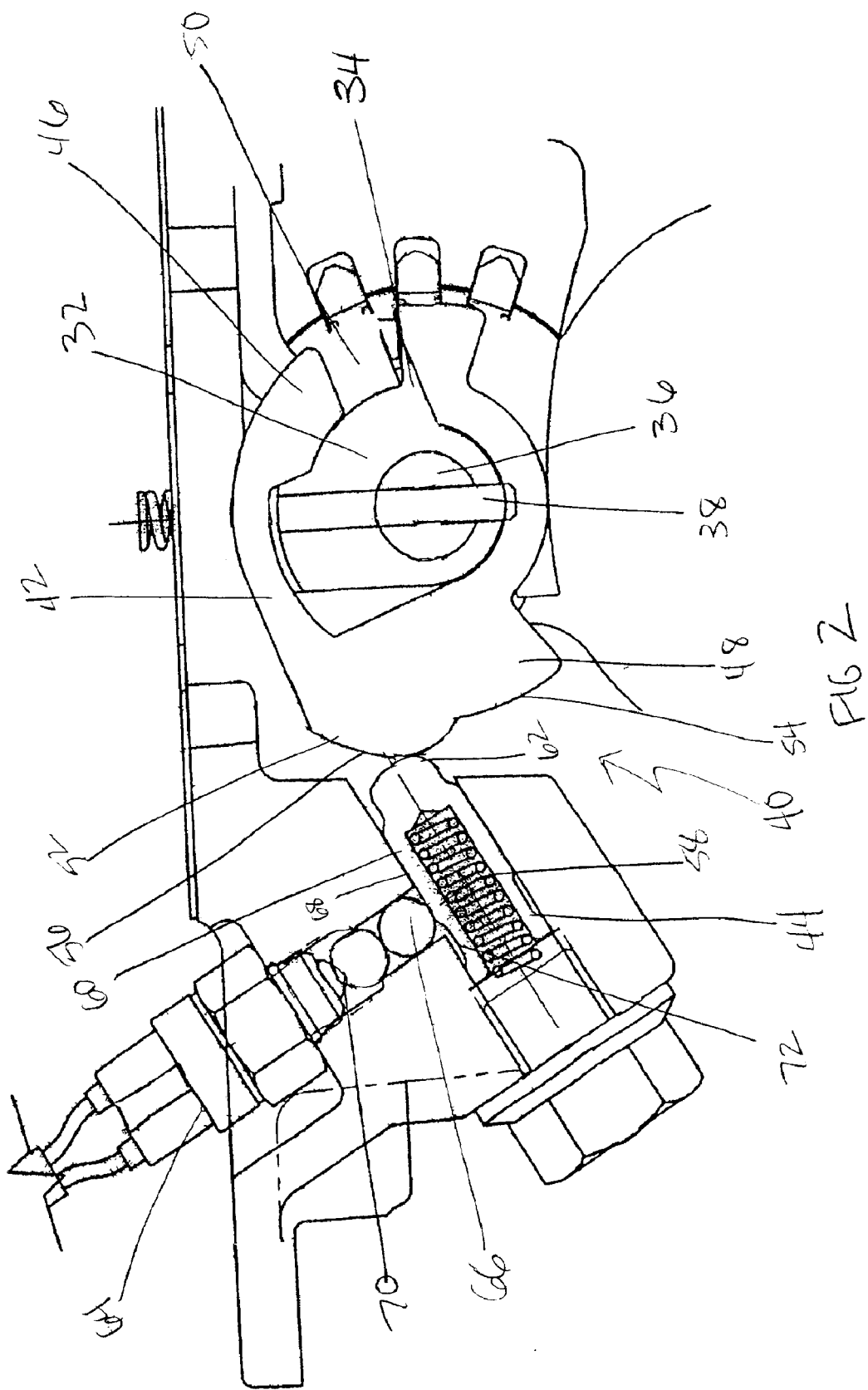
FIG. 2 illustrates a cross sectional side view of the reverse biasing assembly of the present invention when the transmission is in a reverse gear or a first gear.
Figure 3:
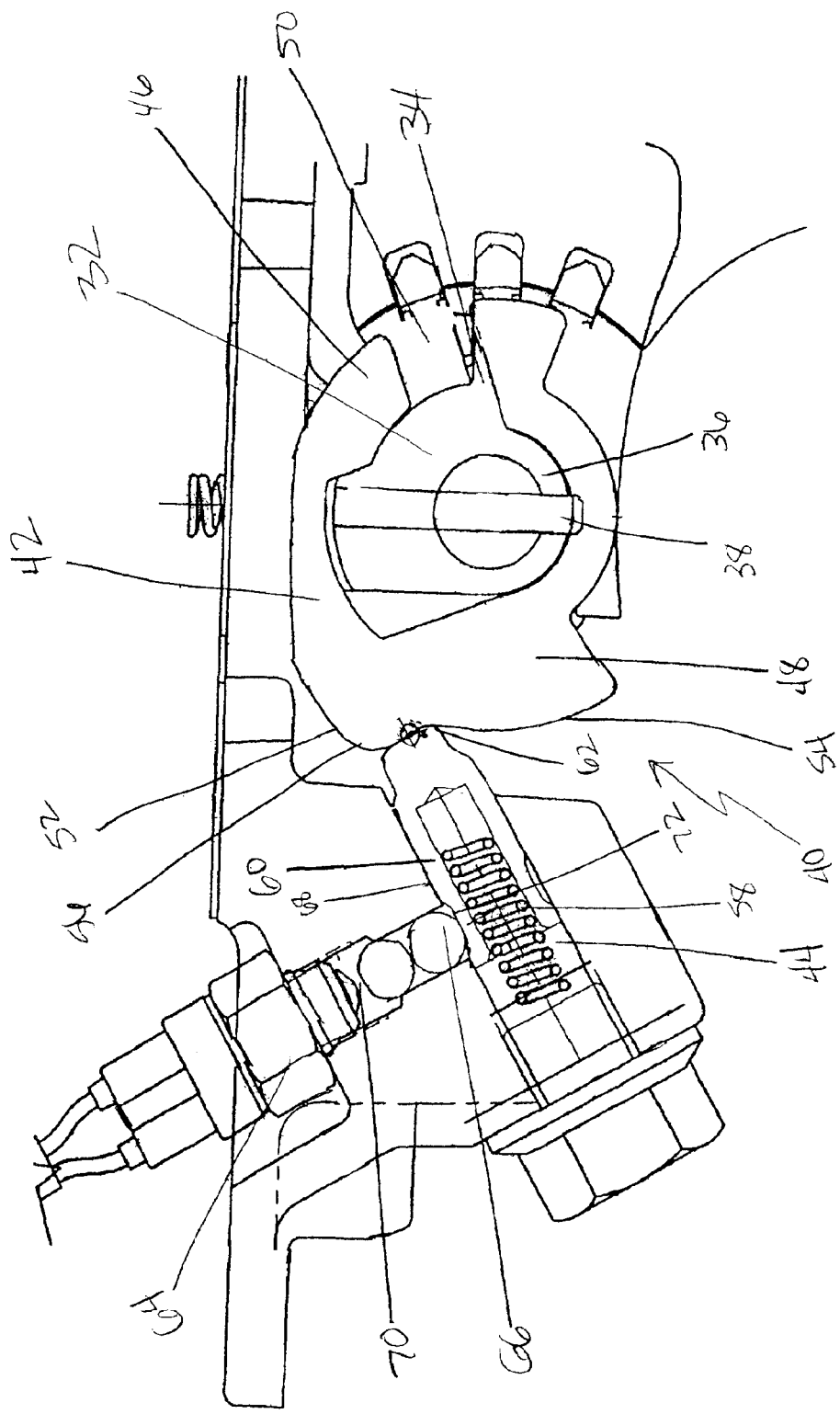
FIG. 3 illustrates a cross sectional side view of the reverse biasing assembly of the present invention when the transmission is in a forward gear other than the first gear.

As illustrated in FIGS. 2 and 3, the manual transmission 10 further includes a reverse biasing assembly 40 including an interlock 42 and a detent 44. The reverse biasing assembly 40 provides feedback, or a shift feel, to the vehicle operator during shifting to indicate where the vehicle operator is in the shift pattern P.

The interlock 42 locks out others shift components and gears during a gear shift and reacts with the detent 44 to provide resistance in the shift lever 12. The interlock 42 is positioned about the shift sleeve 32 and rotates with the shift sleeve 32 as the shift lever 12 is moved from side to side.

The interlock 42 includes a first half 46 and an opposing second half 48. When the interlock 42 is positioned abut the shift sleeve 32, the shift finger 30 is oriented within an aperture 50 in the first half 46 of the interlock 42 to operatively and selectively engages shift components to cause a gear shift during shifting. The first half 46 of the interlock 42 locks out surrounding shift components to prevent accidental shifting of the gears. The opposing second half 48 includes a contoured perimeter 52 with an arcuate surface 54 and an adjacent elevated ramp 56. The arcuate surface 54 is equidistant from axis A and the elevated ramp 56 is positioned at a distance farther from axis A.

The detent 44 includes a spring 58 secured to a housing 60. The housing 60 includes a contact surface 62 which contacts and rides along the contoured perimeter 52 of the interlock 42, providing resistance and a shift feel.

During operation, when the first portion 18 of the shift lever 12 is moved away from neutral in shift pattern P and into either reverse gear or first gear (in the first gear/reverse gate), the shift rail 36 and the attached interlock 42 rotate such that the contact surface 62 of the detent 44 substantially contacts and rides along the ramp 56 of the interlock 42. The spring 58 compresses, increasing the resistance in the shift lever 12 and alerting the vehicle operator that the shift lever 12 has selected a gear in the first gear/reverse gate. The first/revere gate also includes a neutral gear.

When the manual transmission 10 is shifted into another forward gear other than the first gear, the shift rail 36 and the attached interlock 42 rotate such that the contact surface 62 of the detent 44 substantially contacts the arcuate surface 54 of the interlock 42. As the arcuate surface 54 is closer to axis A than the ramp 56, the spring 58 expands as the contact surface 62 sides along the interlock 42, decreasing resistance in the shift lever 12.

The manual transmission 10 of the present invention further includes a detent switch 64 attached to the top cover 16. The detent switch 64 is substantially perpendicular to the housing 60. The detent switch 64 includes a contact pin 66 which rides along the exterior surface 68 of the housing 60 and a switch 70.

A recessed portion 72 is positioned on the exterior surface 68 of the housing 60. When the manual transmission 10 engages a gear in first gear/reverse gate, the contact surface 62 substantially contacts the ramp 56 of the interlock 42, compressing the spring 58. In this position, the exterior surface 68 of the housing 60 pushes the contact pin 66 into substantial engagement with the switch 70, indicating that the manual transmission 10 is in either in first gear or the reverse gear.

When the manual transmission 10 is shifted to another forward gear which is not in the first gear/reverse gate, the interlock 42 rotates so that the contact surface 62 of the housing 60 substantially contacts the arcuate surface 54 of the interlock 42. The spring 58 expands to move the contact surface 62 of the detent 44 towards the interlock 42, releasing tension in the spring 58.

As the spring 58 expands and housing 60 slides towards the interlock 42, the contact pin 66 of the detent switch 64 substantially engages in the recessed portion 72 in the exterior surface 68 of the housing 60. When the contact pin 66 slides into the recessed portion 72, the contact pin 66 break contact with the switch 70. This indicates that the manual transmission 10 is not in a gear in the first gear/reverse gate (reverse gear or first gear). In the preferred embodiment the contact pin 66 is a pin. However, the contact pin 66 can also consist of a plurality of balls.

The detent switch 64 of the present invention determines if the manual transmission 10 engages either the first gear or the reverse gear. If this is determined, additional speed can be employed in the first gear by utilizing the splitter box 26. The splitter box 26 can only be utilized if the contact pin 66 contact the switch 70.

Additionally, the splitter box 26 can only be utilized if the range box 24 indicates that the manual transmission 10 is in the LOW range. A range switch 74 determines if the manual transmission 10 is operating in the HIGH range or the LOW range. If the range switch 74 indicates that the manual transmission 10 is in the HIGH range, the range switch 74 prevents the splitter box 26 from the being utilized.

Additionally, a neutral switch 76 is employed to determine if the manual transmission 10 is in neutral or in a gear. If the neutral switch 76 indicates that the manual transmission 10 is in neutral, the neutral switch 76 prevents the splitter box 26 from being utilized.

To utilize the splitter box 26, the vehicle operator flips a switch in the vehicle cab. In order for the vehicle operator to utilize the splitter box 26, the detent switch 64 must indicate that the manual transmission 10 is in the first gear/reverse gate. Additionally, the range switch 74 must indicate that the transmission 10 is in the LOW range, and the neutral switch 76 must indicate that the transmission 10 is not in neutral. Once all three switches 64, 76, 78 are aligned, the splitter box 26 can be utilized by the vehicle operator.

In the preferred embodiment, the splitter box 26 can only been utilized when the detent switch 64 indicates that the manual transmission 10 is in the first gear or reverse gear. However, in another embodiment, the splitter box 26 can only be utilized when the detent switch 64 indicates that the manual transmission 10 is any gear other than the first gear or the reverse gear. In this embodiment, the splitter box 26 could only be utilized when the contact pin 66 does not engage the switch 70. Also, a particular switch could be utilized to determine that the transmission is in some other set of gear ratios such that the splitter function could be enabled only for those gear ratios.

There are several advantages to utilizing a detent switch 64. For one, by combining the reverse biasing mechanism 40 with a detent switch 64, the splitter box 26 can only be utilized when the manual transmission 10 is in a gear in the first gear/reverse gate.

The present invention provides a combined reverse gate indicator switch. While a particular switch embodiment has been disclosed, it should be understood that other switch embodiments would come within the scope of this invention. Generally, the invention relates to the provision of a switch that provides feedback to a splitter system whether a transmission is in a particular set of gear speeds, or a single gear speed, at which the splitter function will be enabled.

The foregoing description is only exemplary of the principles of the invention. Many modifications and variations of the present invention are possible in light of the above teachings. The preferred embodiments of this invention have been disclosed, however, so that one of ordinary skill in the art would recognize that certain modifications would come within the scope of this invention. It is, therefore, to be understood that within the scope of the appended claims, the invention may be practiced otherwise than as specially described. For that reason the following claims should be studied to determine the true scope and content of this invention.

What is claimed is:

1. A manual transmission assembly comprising:
   a shift lever to operatively rotate an interlock;
   a reverse biasing assembly including said interlock rotatable between a first position and a second position, a detent mechanism which substantially contacts said interlock, said detent mechanism including a housing having an external surface with a recessed portion, and said reverse biasing assembly further including a detent switch which coacts with said external surface of said detent mechanism to indicate when said interlock is in said first position;
   a shift rail rotatable and axially moveable by said shift lever, said shift rail rotating with said interlock;
   a plurality of shift forks operatively engageable by said shift rail; and
   a plurality of gears operatively connected to said plurality of shift forks.

2. The manual transmission assembly as recited in claim 1 wherein said interlock further includes a contoured perimeter having an arcuate surface and a raised ramp and said detent mechanism further includes a contact surface which substantially contacts said contoured perimeter of said interlock.

3. The manual transmission assembly as recited in claim 2 wherein said contact surface of said detent mechanism substantially contacts said raised ramp of said interlock when said interlock is in said first position.

4. The manual transmission assembly as recited in claim 3 wherein said detent mechanism is biased by a spring member to allow said contact surface of said detent mechanism to substantially contact said contoured perimeter of said interlock when said interlock is in said second position.

5. The manual transmission assembly as recited in claim 4 wherein said spring is in said housing of said detent mechanism.

6. The manual transmission assembly as recited in claim 2 wherein said contact surface of said detent mechanism substantially contacts said raised ramp of said interlock when said interlock is in said first position, said detent switch including a contact pin that cooperates with said exterior surface of said housing, said contact pin engaging said elevated portion of said exterior surface of said housing of said detent mechanism when said interlock is in said first position, and said contact pin engages said detent switch indicating that said manual transmission assembly is in a reverse gear or a first forward gear.

7. The manual transmission assembly as recited in claim 1 wherein said manual transmission assembly is in a reverse gear or a first forward gear when said interlock is in said first position.

8. The manual transmission assembly as recited in claim 1 wherein said detent switch includes a contact pin that cooperates with said exterior surface of said housing.

9. The manual transmission assembly as recited in claim 8 wherein said contact pin engages said elevated portion of said exterior surface of said detent mechanism when said interlock is in said position.

10. The manual transmission assembly as recited in claim 9 wherein said contact pin engages said detent switch when said contact pin engages said elevated portion of said detent mechanism.

11. The manual transmission assembly as recited in claim 10 wherein said manual transmission assembly is in a reverse gear or a first forward gear when said contact pin engages said elevated portion of said external surface of said detent mechanism.

12. The manual transmission assembly as recited in claim 9 wherein said detent mechanism is biased by a spring member, and said detent switch engages said elevated portion of said external surface of said housing when said manual transmission assembly is in a reverse gear or a first forward gear.

13. The manual transmission assembly as recited in claim 8 wherein said contact pin engages said recessed portion of said exterior surface of said detent mechanism when said interlock is in said second position.

14. The manual transmission assembly as recited in claim 13 wherein said contact pin does not engages said detent switch when said contact pin engages said recessed portion of said external surface of said detent mechanism.

15. The manual transmission assembly as recited in claim 1 further including a splitter mechanism, and said detent switch provides a signal to said splitter mechanism indicating if said interlock is in said first position or said second position.

* * * * *